Figure 1:
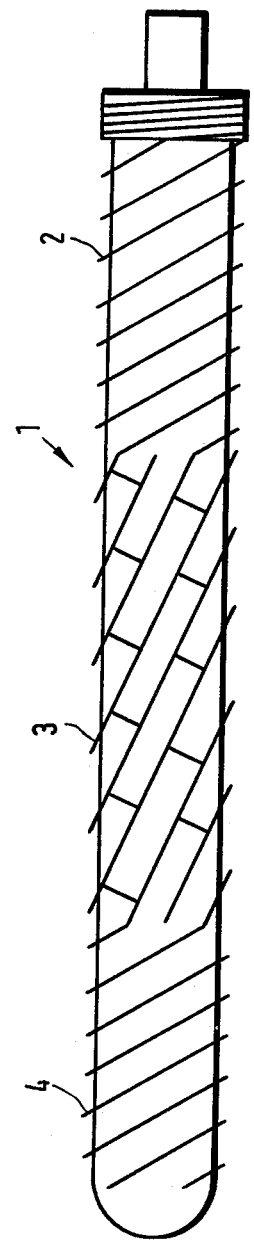

United States Patent

Anders

[11] 4,107,788
[45] Aug. 15, 1978

[54] EXTRUDER SCREW

[75] Inventor: Dietmar Anders, Hanover, Fed. Rep. of Germany

[73] Assignee: Hermann Berstorff Maschinenbau GmbH, Hanover-Kleefeld, Fed. Rep. of Germany

[21] Appl. No.: 771,642

[22] Filed: Feb. 24, 1977

[30] Foreign Application Priority Data

Feb. 26, 1976 [DE] Fed. Rep. of Germany ....... 2608307

[51] Int. Cl.² .............................................. B29B 1/06
[52] U.S. Cl. ....................................... 366/81; 366/90; 366/319; 366/324
[58] Field of Search ........................ 259/191, 192, 193; 366/79, 80, 81, 90, 319, 324; 425/207, 208

[56] References Cited

U.S. PATENT DOCUMENTS

| 3,687,423 | 8/1972 | Koch | 259/191 |
| 3,924,839 | 12/1975 | Millauer | 259/191 |
| 3,945,622 | 3/1976 | Sokolow | 259/191 |

Primary Examiner—Robert W. Jenkins
Attorney, Agent, or Firm—Donald D. Jeffery

[57] ABSTRACT

An extruder screw for the processing of thermoplastics, natural rubber and other elastomeric materials, comprising a screw core and a plurality of webs spiralling around the core and forming a multi-start thread in which, for at least a portion of the length of the extruder screw, the webs each have alternating lengths of lower height and lengths of greater height and, at the trailing end, having regard to the direction of rotation of the screw, of each of the web lengths of greater height, a transverse web is provided of approximately the same height as the web lengths of lower height, such transverse webs each connecting the trailing end of a respective one of the web lengths of greater height with the leading end of one of the web lengths of lower height of the next adjacent rearward, having regard to the direction of conveyance of material through the extruder, one of the webs. Preferably the lengths of web of greater height and the lengths of web of lower height are all of equal length.

3 Claims, 3 Drawing Figures

EXTRUDER SCREW

The invention relates to an extruder screw for the processing of thermoplastics, natural rubber and other elastomeric materials, having extending spirally around a core of the screw, a plurality of screw webs forming a multi-start thread.

German Offenlegungschrift No. 19 24 239 discloses an extruder screw having, at regular intervals and lengths, web portions of alternately lower and greater height. The material which is to be processed by such a screw is thus able, once it has been scraped off the inside surface of the cylinder by the active flank of the web, of passing over a lower height portion of web into the next rearward thread of the screw. It is this shearing of the material over a lower height portion of the web which achieves a certain homogenising of the material.

However, a screw which is constructed in this way cannot ensure that every particle of material is sheared at least once over a lower portion of web. Therefore, it is not altogether out of the question that the material may still contain pockets of material which is not fully homogenised when it leaves the extruder. Such inadequately plasticised pockets of material interfere considerably with further processing or may even render further processing for certain purposes impossible.

U.S. Pat. No. 3,687,423 to Koch discloses an extruder screw with so called "flow dividing modes", which are formed by oblique webs with portions of webs adjacent thereto and lower in comparison with the webs which are of normal height. A screw which is designed in this way can ensure that all particles of material are sheared over a lower web so that pockets of material are broken down. A disadvantage is that the material present in a thread of the screw has to be sheared over a very short transverse web with a somewhat longer oblique web adjacent to them. This forced shearing over a relatively short lower web area calls for a high pressure loss which has a disadvantageous effect on the rate of delivery of the screw. Another disadvantage is the fact that in this relatively small area of the cylinder, a localised substantially greater amount of friction energy is created than can be dissipated by the cooling of the cylinder.

In order to resolve this problem, it has been suggested in U.S. Pat. No. 3,924,839 to Millauer that transverse webs be notched in the direction of the screw axis. Screw webs which are thus notched have the disadvantage that it is impossible to be sure that all particles of the material are subjected to the same amount of working, because individual particles can pass through the notches without being pulverised, i.e. the so-called "sieve-like" effect of a blender which is so designed is no longer provided.

The greatest disadvantage of the extruder screws according to German Patent Specification No. 18 16 440 and German Auslegeschrift No. 22 56 902 resides however in that manufacture is extremely difficult. Since no regularly rotating spiral screw webs are provided, mechanical production of such a screw is extremely difficult, as will be readily appreciated.

The object of the present invention is to provide an extruder screw which is very easy to produce and which nevertheless ensures an excellent blending and shearing action on the material to be processed, with no likelihood of any unprocessed particles of material reaching a tool disposed at the extruder outlet and causing disturbing effects. Furthermore, it is an object of the present invention to provide a blending and homogenising screw which can be produced with screw webs which extend spirally and parallel with one another, on the pattern of a multi-start screw.

According to the invention there is provided an extruder screw for the processing of thermoplastics, natural rubber and other elastomeric materials, comprising a screw core and a plurality of webs spiralling around the core and forming a multi-start thread in which, for at least a portion of the length of the extruder screw, the webs each have alternating lengths of lower height and lengths of greater height and, at the trailing end, having regard to the direction of rotation of the screw, of each of the web lengths of greater height, a transverse web is provided of approximately the same height as the web lengths of lower height, such transverse webs each connecting the trailing end of a respective one of the web lengths of greater height with the leading end of one of the web lengths of lower height of the next adjacent rearward, having regard to the direction of conveyance of material through the extruder, one of the webs.

Such an extruder screw can be produced relatively easily by virtue of its having normally milled spiral screw webs, it is furthermore assured that by disposing the transverse webs which partially block the normal screw thread which connects the end of the (viewed in the direction of conveyance of material around the screw) high portion of a web with the commencement of the adjacent rearward high portion of web, all particles of material are sheared once over a lower portion of web and are thus pulverised. This measure ensures that no unprocessed pockets of material can reach the outlet of the extruder. Since the process of shearing material over a low portion of web is repeated many times either over the spirally encircling low portions of screw web or over the low transverse webs which are disposed in the threads of the screw, it can be ensured that total pulverisation or processing of all particles of material and thus complete homogenisation can be achieved.

Preferably, viewed as a whole, the lengths of web of lower height correspond in length to the lengths of web of greater height. This provides that the material is sheared in a very gentle fashion because a sufficiently long shearing area can be thus made available. Due to the continuous repetition of the shearing process, adequate distribution and comminution of the material are ensured without any significant frictional heat being generated.

The invention is diagrammatically illustrated by way of example in the accompanying drawings, in which.

Figure 2:
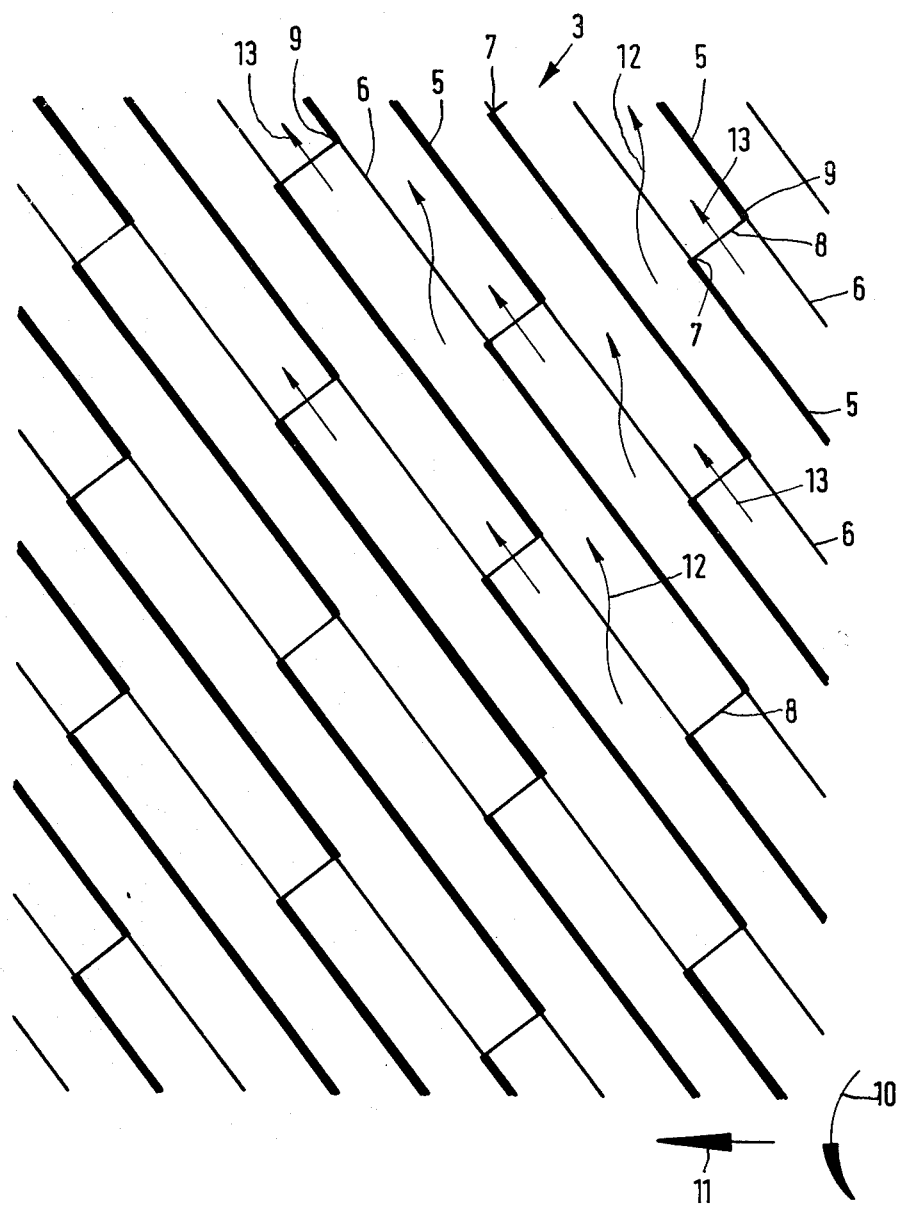
Figure 3:
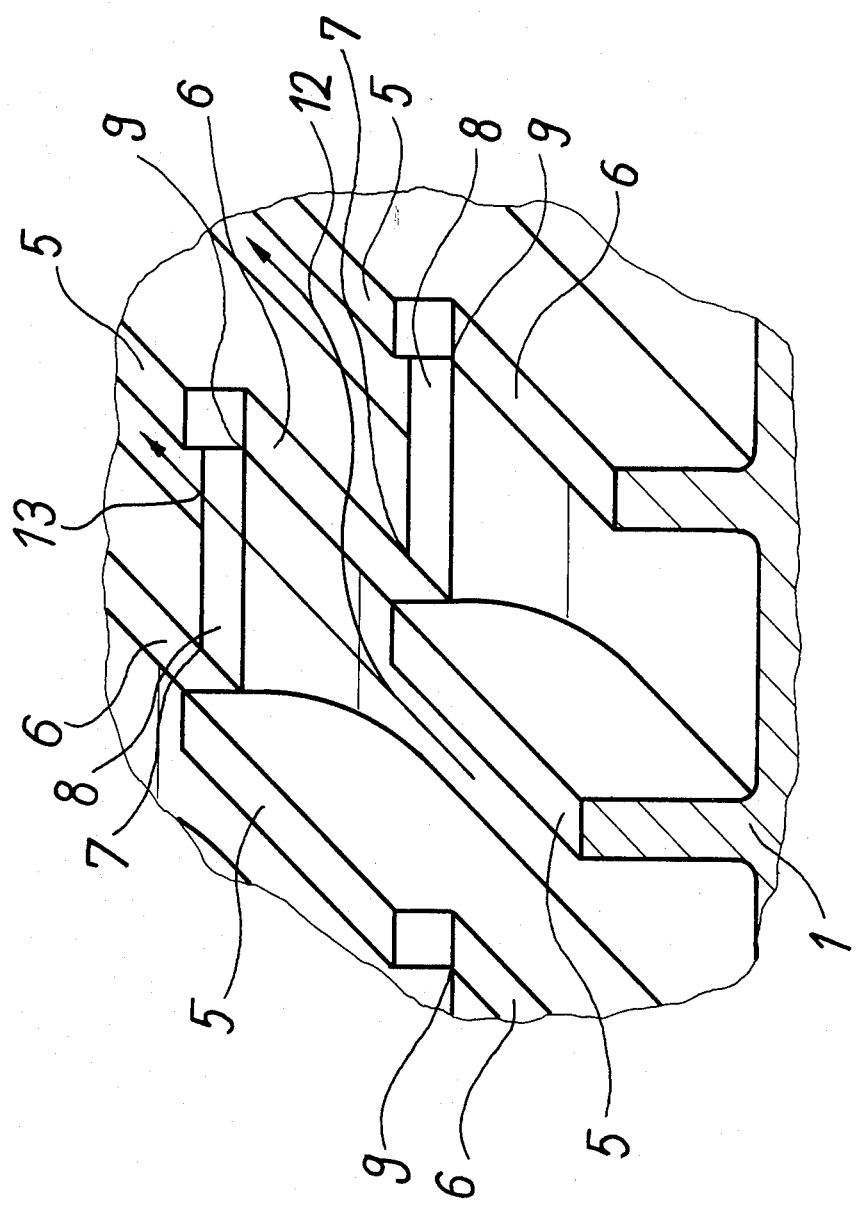

FIG. 1 schematically shows an extruder screw according to the invention;

FIG. 2 is a schematic development of a blender section of the extruder screw of FIG. 1, and FIG. 3 is a fragmentary perspective and partially sectional view showing in enlarged form the web lengths of lower and greater heights, and the transverse webs.

Referring to the drawings and first to FIG. 1, an extruder screw 1 has an intake section 2, a blender section 3 and a delivery section 4.

The development of the blender section 3 shown in FIG. 2 shows that the screw thread is a multi-start thread and comprises a plurality of webs extending spirally around a core of the screw in parallel with one another. In the blender section 3 the webs themselves are sub-divided into lengths 5 of greater web height indicated by thick lines and, adjacent to them, lengths 6 of lower web height indicated by thinner lines.

The heights of the web lengths 5 and 6 of the extruder screw 1 are selected according to the overall screw diameter and the material which it is designed to process. Extruder screws for the processing of natural rubber for example require substantially lower screw threads or alternatively larger web heights than screws for processing plastics materials.

For example, the difference in height between the greater height web lengths 5 and the lower height web lengths 6 at the commencement of the blender section 3 is about 10 to 1 mm. The web height diminishes and the screw core diameter increases towards the output end of the blender section 3. The difference in heights between the greater height web lengths 5 and the lower height web lengths 6 at the output end of the blender section 3 may amount to 3 to 0.3mm for example.

At the location identified by reference numeral 7, the greater height web lengths 5 ends and is followed by the spirally extending lower height web length 6. From the location 7, a transverse web 8 extends to the commencement 9 of the next rearwardly adjacent greater height web length 5.

The transverse web 8 is approximately the same height as the lower height web lengths 6.

Material located in the screw thread is sheared over the lower height web length 6 by the rotation of the screw, the direction of which is indicated by arrow 10, and passes into the neighbouring thread. The movement is indicated by the arrows 12. Subsequently, the material in this thread of the screw is conveyed in the direction of conveyance, indicated by arrow 11, until it arrives at the next lower height web length 6, which it again crosses. Part of the material however fails to cross the lower height web length 6, crossing instead the transverse web 8, as indicated by the arrows 13.

This process is repeated continuously resulting in a multiple shearing of the material over the lower height web lengths 6 and the transverse webs 8.

The multiple shearing ensures that every particle of material is sheared many times over the lower height web lengths 6 of the webs and the transverse webs 8 and is thus completely evenly homogenised.

The lower height web lengths 6 correspond in their length more or less to the length of the normal height web lengths 5. Thus, the lower height webs afford unprocessed pockets of material the opportunity of passing over many available surfaces. Therefore, the as yet not pulverised pockets of material are gently, and without excessive inner friction, pulverised so ensuring that any increase in the temperature of the material is only negligible. This gentle processing of the material with only minimal generation of frictional heat is achieved by the long low height web lengths 6 in conjunction with the transverse webs 8 of the same height.

An extruder screw according to the invention can ensure a very intensive distribution of the material to be processed by reason of the transverse webs 8 and the lower height web lengths 6 which are adjacent thereto, and also an excellent division of the material by reason of the multiple shearing of the material over the lower height web lengths and the transverse webs. Since the blending and homogenising part section 3 has in total a considerable length of lower height web length the build-up of material in front of the webs is minimal; the crossing-over and thus the shearing is distributed over a considerable length, so ensuring gentle treatment of the material.

What is claimed is:

1. An extruder screw for the processing of the thermoplastics, natural rubber and other elastomeric materials, comprising a screw core and a plurality of webs spiralling around said core and forming a thread therein, wherein, for at least the blender section of the length of the extruder screw, each web has alternating lengths of lower height and lengths of greater height; transverse webs extending between adjacent webs, said transverse webs being positioned approximately at the end of a web length of greater height in one web and the beginning of a web length of greater height in the adjacent web, said transverse webs being of approximately the same height as said web lengths of lower height.

2. The extruder screw as claimed in claim 1, wherein said lengths of webs of lower height are all of equal length.

3. The extruder screw of claim 1 wherein the web lengths of greater height substantially correspond in length with the web lengths of lower height.

* * * * *